March 3, 1931.  W. G. JENSEN ET AL  1,794,694
SAFETY HOOK
Filed May 31, 1930
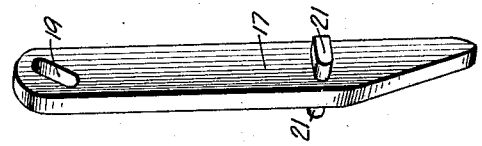
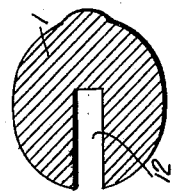
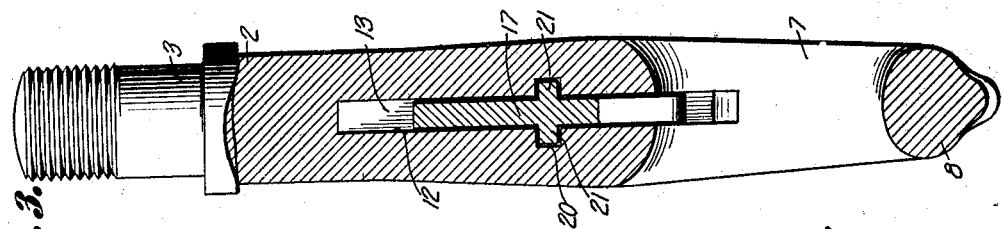
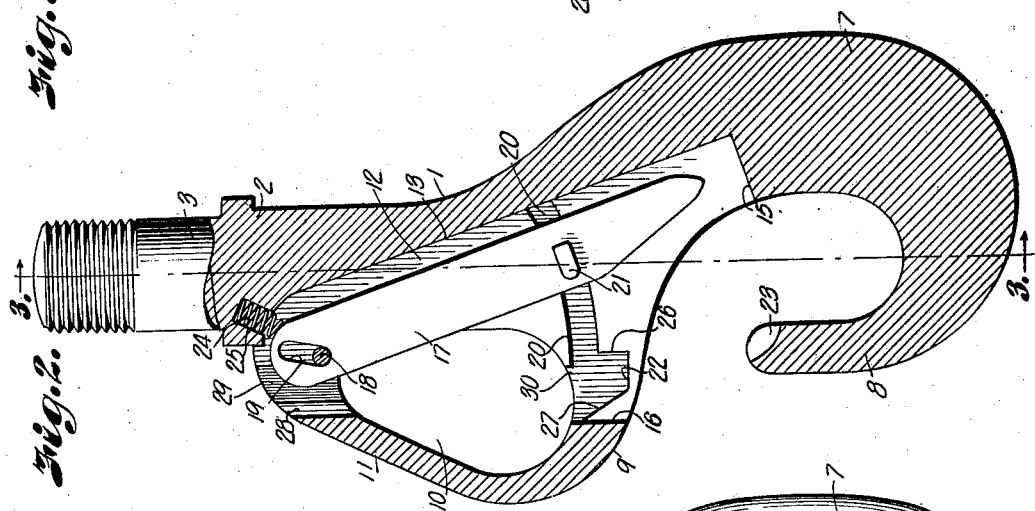
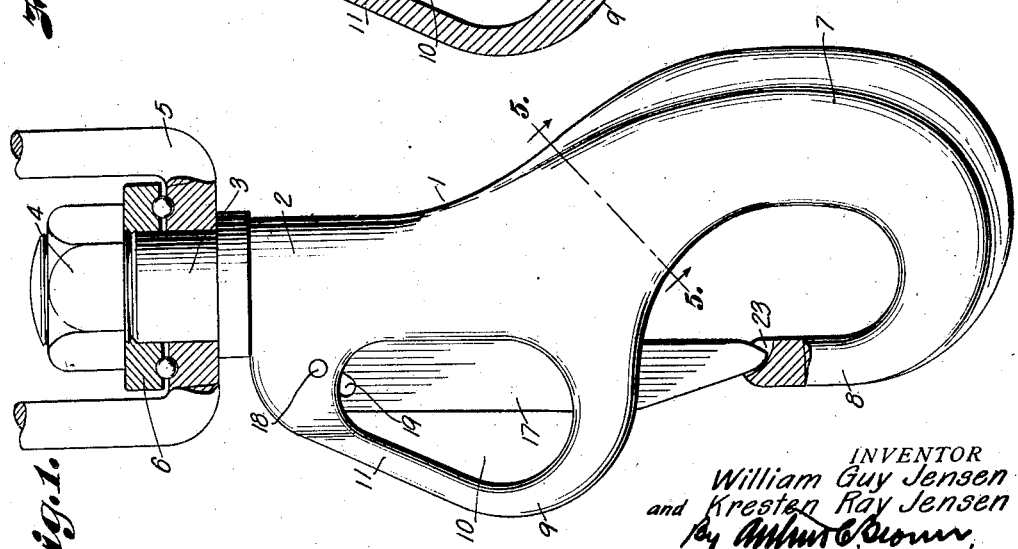
INVENTOR
William Guy Jensen
and Kresten Ray Jensen
ATTORNEY Patented Mar. 3, 1931

1,794,694

UNITED STATES PATENT OFFICE

WILLIAM GUY JENSEN AND KRESTEN RAY JENSEN, OF COFFEYVILLE, KANSAS

SAFETY HOOK

Application filed May 31, 1930. Serial No. 458,545.

Our invention relates to hooks and more particularly to hooks having safety latches for closing the entrances to the hooks, the principal objects of the invention being to facilitate movement of a latch into and out of functioning position, to automatically latch a latch member in hook closing position, to assure movement of a latch into hook closing position, and to require positive operation of a latch for opening the hook.

In accomplishing these and other objects of the invention, we have provided improved details of structure, the preferred forms of which are illustrated in the accompanying drawings, wherein:

Fig. 1 is a perspective view of a hook embodying my invention, the tip of the bill being shown in section for better illustrating the seat for the latching member.

Fig. 2 is a vertical central section of the hook illustrating the position and path of movement of the latching member mounted therein.

Fig. 3 is a section on the line 3—3, Fig. 2.

Fig. 4 is a perspective view of the latching member.

Fig. 5 is a section on the line 5—5, Fig. 1.

Referring in detail to the drawings:

1 designates a hook body including a neck portion 2 having a screwthreaded stem 3 adapted to receive a nut 4 for securing a bail 5 to the hook. A bearing element 6 may be interposed between the nut and the bail to permit swiveling of the hook when suspended from the bail.

The body further includes an arcuate rearwardly extending portion 7 and a bill or hook portion 8 curved upwardly forwardly in spaced relation with the rear portion 7 to form a socket to receive an elevator bail or the like adapted to be supported by the hook.

The portion of the body between the portion 7 and the neck comprises a handle portion, and extending forwardly therefrom is a wing 9 having an opening 10 producing a wing arm or guard 11 spaced from the body by the opening.

The lower edge of the wing extends arcuately in spaced relation with the tip of the bill to provide the entrance to the hook and merges with the arcuate inner edge of the body portion 7.

A central longitudinally extending recess or channel is formed in the body and wing in alignment with the bill comprising a central groove 12 in the body having a rear wall 13 extending angularly across the axis of the hook, and a lower front stop wall 15 located forwardly from the body in the guard. A slot 16 is formed in the merging lower edge of the wing and front edge of the body to provide an entrance to the channel and guide or keeper rails for a safety lever or latching bar 17.

A pin 18 extends across the upper end of the channel adjacent the upper margin of the opening 10, and the latching bar 17 is provided with an elongated slot 19 in its upper end extending angularly to the axis of the bar for mounting the bar on the pin. The bar is adapted to swing on the pin through the slot 16 toward and away from the tip of the bill and into and out of the portion of the channel 12 formed in the body.

Registering grooves 20 are formed in the body and wing on opposite sides of the channel to provide tracks for lugs 21 extending in alignment from opposite sides of the latching bar 17. The upper and lower walls of the grooves extend arcuately from front to back of the device on arcs having the pin 16 as their axes whereby the lugs may travel freely in the grooves while the bar is pivoting on the pin, the lugs retaining the lower wall of the slot in engagement with the pin as illustrated in Fig. 2.

Recesses or sockets 22 are formed in the arcuate floors or lower walls of the grooves at the front end thereof having sufficient depth to permit the lugs to move downwardly when the bar is in vertical position for seating the reduced tip of the bar in a recess or seat 23 formed in the tip of the bill.

A coil spring 24 seated in an angularly extending socket 25 formed in the neck of the hook and anchored against the bottom of the socket bears downwardly angularly against the arcuate upper end of the bar and thus tends to shift the bar downwardly into the sockets 22 to assure seating of the point of the bar in the bill seat when the lugs reach the recesses.

The vertical rear walls 26 of the recesses 22 comprise stop walls engaged by the lugs to prevent accidental lateral displacement of the latching bar from the position wherein it closes the entrance to the hook.

The seat 23 tapers upwardly forwardly to form an inclined wall to receive the tip of the bar, and the end of the bar is tapered upwardly outwardly from the tip.

The floors of the recesses 22 are substantially perpendicular to the axis of the hook to form horizontal seats for the lugs 21, and the front walls 27 of the recesses incline upwardly forwardly to the stop wall 15.

The spring 24 bears against the arcuate end of the latching bar rearwardly of the axis thereof and rearwardly of the upper end of the slot therein but adjacent the end of the slot.

The pin 16 is mounted a substantial distance in front of the axis of the hook and substantially in alignment with the seat of the bill, whereby the lower end of the bar tends to move forwardly from the recess to the bill.

In order to assemble the bar 17 in the hook the upper face of the wing is provided with a rectangular opening 28 having side grooves 29 to receive the lugs 21 so that the bar can be inserted therethrough into the channel 12. The lugs 21 enter the grooves 20 through an opening 30 formed in the wing above the sockets 22.

In using the device, the operator may extend his fingers through the opening and press the bar into the body recess for admitting a bail to the hook. When the bar is released it pivots on the pin, the lower end moving toward the bill, and the spring 24 tends to shift the bar longitudinally and assure the entrance of the lip into the recesses 22.

The bar thus latches a bail in the hook, and cannot be accidentally displaced should the bail or elevator supported thereby be jarred or catch on derrick structure. The bar is protected from accidental disturbance and has no projecting parts except the lower end which is securely retained by the rear walls of the recesses.

The bar may easily be lifted to disengage the lugs from the recesses, and pivoted rearwardly to open the entrance to the hook for removing the elevator bail.

What we claim and desire to secure by Letters Patent is:

1. In a safety hook, a body having a recess in its front face, a pivot pin in said recess, a latching bar slidably and pivotally mounted on the pin, and adapted to engage the bill of the body on its inner face, and means for retaining the bar in bill-engaging position.

2. In a safety hook, a body having a recess in its front face, a pivot pin in said recess, a latching bar having an elongated slot for slidably mounting the bar on the pin, the bar being adapted to engage the bill of the body on its inner face, and means for retaining the bar in bill-engaging position.

3. A safety hook having a bill provided on its inner face with an upwardly forwardly inclined seat, a latching bar pivotally supported by the hook and adapted to engage the seat for closing the entrance to the hook, and means for retaining the bar in seat-engaged position.

4. A safety hook having a bill provided on its inner face with an upwardly forwardly inclined seat, a latching bar pivotally supported by the hook and adapted to be moved to vertical position for engaging the seat to close the entrance to the hook, and means for retaining the bar in seat-engaged vertical position.

5. A safety hook having a bill, a latching bar pivotally supported by the hook and adapted to be moved vertically to engage the seat for closing the entrance to the hook, and means for retaining the bar in seat-engaged vertical position.

6. A safety hook having a bill, a latching bar pivotally supported by the hook and adapted to be moved vertically to engage the seat for closing the entrance to the hook, means urging the bar toward the seat, and means for retaining the bar in seat-engaged vertical position.

7. In a safety hook, a body having a bill and a wing provided with an opening forming a guard, the body having a groove in its front face, a latching bar pivotally supported by the body and adapted to swing into and out of said front face groove, and lateral lugs on the bar, the body being provided with grooves in opposite walls of the face groove forming guide tracks for said lugs.

8. In a safety hook, a body having a bill and a wing provided with an opening forming a guard, the body having a slot extending into the wing across the lower end of said opening, a latching bar pivotally supported by the body and adapted to swing in said slot, lateral lugs on the bar, the body being provided with grooves in opposite walls of the face groove forming guide tracks for said lugs, and having a socket to receive the lugs for retaining the bar in vertical position.

9. A safety hook including a handle, a bill and a wing provided with an opening forming a guard, and having a slot extending across the lower end of said opening, a latching bar pivotally supported by the hook and adapted to swing in said slot toward and away from the bill, and to move vertically toward the bill, a lateral lug on the bar, the body being provided with a guide for said lug, and having a socket in the floors of the guide to receive the lug for retaining the bar in vertical bill-engaging position.

10. In a safety hook, a body having a bill and a wing provided with an opening forming a guard, the body having a groove in its front face, a latching bar pivotally supported by the body and adapted to swing into and out of said front face groove, and a lateral lug on the bar, the body being provided with an arcuate groove in a side wall of the face groove, and said wing being provided with an opening to provide for entrance of the bar into the body.

11. In a safety hook, a body having a bill and a wing provided with an opening forming a guard, the body having a groove in its front face, a pivot pin extending transversely through said groove, a latching bar slidably and pivotally mounted on said pin and adapted to swing into and out of said front face groove, and a lateral lug on the bar, the body being provided with an arcuate groove in a side wall of the face groove on a common axis with said pin, and said wing being provided with aligning openings communicating with the face groove to provide for entrance of the bar into the body.

In testimony whereof we affix our signatures.

WILLIAM GUY JENSEN.
KRESTEN RAY JENSEN.